(12) United States Patent
Shibuya et al.

(10) Patent No.: US 8,040,425 B2
(45) Date of Patent: Oct. 18, 2011

(54) IMAGING APPARATUS AND IMAGING METHOD USING ND FILTERS FOR COLOR-TEMPERATURE CORRECTION

(75) Inventors: Kazuaki Shibuya, Kanagawa (JP); Hideki Nakamaru, Kanagwa (JP)

(73) Assignee: Sony Corporation, Tokyo (JP)

( * ) Notice: Subject to any disclaimer, the term of this patent is extended or adjusted under 35 U.S.C. 154(b) by 481 days.

(21) Appl. No.: 12/061,048

(22) Filed: Apr. 2, 2008

(65) Prior Publication Data

US 2008/0246856 A1 Oct. 9, 2008

(30) Foreign Application Priority Data

Apr. 3, 2007 (JP) ................ P2007-097593

(51) Int. Cl.
*H04N 5/225* (2006.01)
*A62B 1/04* (2006.01)
*G03B 7/00* (2006.01)
(52) U.S. Cl. ........... 348/342; 348/360; 348/65; 396/213
(58) Field of Classification Search .............. 348/65–76, 348/342, 360; 396/213
See application file for complete search history.

(56) References Cited

U.S. PATENT DOCUMENTS

| 6,930,723 B1 * | 8/2005 | Tsuda et al. ................. 348/363 |
| 2005/0088537 A1 * | 4/2005 | Nakamura et al. ......... 348/223.1 |

FOREIGN PATENT DOCUMENTS

| JP | 5 137147 | 6/1993 |
| JP | 7-143496 | 6/1995 |
| JP | 9-205653 | 8/1997 |
| JP | 11-289547 | 10/1999 |
| JP | 11341502 A | * 12/1999 |
| JP | 2001-016596 | 1/2001 |
| JP | 2001-86400 | 3/2001 |
| JP | 2001-218216 | 8/2001 |
| JP | 2006-80984 | 3/2006 |

* cited by examiner

*Primary Examiner* — Lin Ye
*Assistant Examiner* — Mekonnen Dagnew
(74) *Attorney, Agent, or Firm* — Frommer Lawrence & Haug LLP; William S. Frommer; Ellen Marcie Emas

(57) ABSTRACT

An imaging apparatus includes one or a plurality of optical filters, an image sensor, an imaging signal processing part, a detecting part, and a control part. The one or the plurality of optical filters are selectively arranged in a path of an optical system for obtaining imaging light. The image sensor is provided for converting the imaging light obtained through the optical system into an imaging signal. The imaging signal processing part is provided for subjecting the imaging signal from the image sensor to a color-temperature correction processing. The detecting part is provided for detecting a type of the one or the plurality of optical filters arranged in the optical system. The control part is provided for adjusting a color temperature that is set at the imaging signal processing part to a color temperature defined for each filer detected by the detecting part.

4 Claims, 5 Drawing Sheets

FIG. 4

| ND FILTER | COLOR TEMPERATURE | PRESET SW ON |
|---|---|---|
| ABSENCE | 3200K | (PRESET COLOR TEMPERATURE) |
| 1/4 | 5600K | |
| 1/16 | 5600K | |
| 1/64 | 5600K | |

FIG. 5

| ND FILTER | COLOR TEMPERATURE | PRESET SW ON |
|---|---|---|
| ABSENCE | 3200K | (PRESET COLOR TEMPERATURE) |
| 1/4 | 4300K | |
| 1/16 | 5600K | |
| 1/64 | 6200K | |

FIG. 6A

```
      ND & CC  SETTING

ND 1        3200K
   ND 2        5600K
   ND 3       [5600K]
   ND 4        5600K

CC SW SEL   5600K
```

FIG. 6B

```
      ND & CC  SETTING

ND 1        3200K     3200K
   ND 2        5600K     4300K
   ND 3       [5600K] ⇒  5600K
   ND 4        5600K     6300K

CC SW SEL   5600K
```

FIG. 6C

```
      ND & CC  SETTING

ND 1        3200K
   ND 2        5600K
   ND 3        6300K
   ND 4        5600K

CC SW SEL   5600K
```

IMAGING APPARATUS AND IMAGING METHOD USING ND FILTERS FOR COLOR-TEMPERATURE CORRECTION

CROSS REFERENCE TO RELATED APPLICATIONS

The present invention contains subject matter related to Japanese Patent Application 2007-097593 filed in the Japanese Patent Office on Apr. 3, 2007, the entire contents of which being incorporated herein by reference.

BACKGROUND OF THE INVENTION

1. Field of the Invention

The invention relates to an imaging apparatus applied to a video camera in which an optical filter, such as an ND filter, can be selectively arranged. The invention also relates to an imaging method applied in such an imaging apparatus, particularly relating to color-temperature setup technology.

2. Description of the Related Art

Capturing an image using a video camera may require the setting of appropriate color temperature, which can be provided as the basis for an imaging signal. The phrase "setting of color temperature" means that, for example, when capturing an image of a white subject, color temperature is adjusted (corrected) for allowing the white portion of the subject to remain white in a reproduced video image. Color temperature varies depending on whether imaging is carried out under the sun light or under illuminating light. Even in the case of the illuminating light, color temperature varies depending on the kinds of illumination. Also, even in the case of imaging under the sun light, appropriate color temperature may differ depending on the situation of the morning sun or the sunset or the daytime.

The correction of color temperature in a video camera may be optically carried out on imaging light using an optical filter or may be electrically carried out by adjusting a balance of three primary color signals (R, G, B signals) to an appropriate one for an imaging signal obtained by imaging with an image sensor.

Here, an optical filter may be attached to a lens part of the video camera and may be any of neutral density filters (ND filters). The ND filters are used to reduce the amount of light incident on an image sensor. Basically, the ND filters do not alter the color characteristics of light. For example, the ND filter to reduce the amount of light to one fourth ($1/4$), one sixteenth ($1/16$), one sixty fourth ($1/64$), or the like is used.

Such ND filter may be used, for example, outdoors in the daytime to reduce the amount of light, where an image will be captured under very bright environment. Alternatively, when capturing an image indoors, the ND filter may be used depending on the imaging conditions for allowing a user to capture an image under almost full aperture with a shallow depth of field.

Such ND filters may be arranged in different ways. The ND filter may be independent from a camera and manually attached outside on the tip portion of a lens barrel thereof. Alternatively, the ND filter may be previously incorporated in a camera and the arrangement of the built-in ND filter in the light path of the camera can be selectively carried out by a switching operation. In the case of externally mounting a separate ND filter, the filter can be manually attached and removed by the user and such works can be time-consuming. In contrast, in the case of a camera previously incorporating the ND filter, the user can be allowed to select the imaging with the ND filter or the imaging without the ND filter by one-touch switching operation or the like.

Furthermore, in the case of a camera incorporating the ND filter, a plurality of ND filters are incorporated so that these ND filters can be selectively used. In the case of incorporating such a plurality of ND filters, these ND filters are arranged, for example, on a rotating plate provided in the camera at angles with predetermined intervals. Thus, the filters can be selected by the setting of the rotational angle position of the rotating plate.

Also, color-compensating filters (CC filters) that carry out the color temperature correction as described above may be assembled into a similar kind of rotating plate in a video camera as described above. Thus, temperature correction for two or more kinds of color can be optically carried out by setting the rotational angle position of the rotating plate.

Japanese Unexamined Patent Application Publication No. H05-137147 describes an example of a video camera that is capable of carrying out color temperature correction.

SUMMARY OF THE INVENTION

The ND filter is selected depending on the luminance of the surroundings, while the color temperature filter is selected depending on the color temperature of the illumination (depending on indoors or outdoors, or the like). However, in many cases, at the outside of a house in the daytime, a color-temperature correction filter for the daytime-sunlight may be used in combination with an ND filter with a large attenuation. In contrast, at the inside of the house, a color-temperature correction filter for indoor illumination (e.g., fluorescent lamp) may be used in combination with an ND filter with a small attenuation.

Particularly, in the case of a handheld video camera carried on a photographer's shoulder to capture images, the photographer often captures images while walking. The imaging conditions may change during the imaging, such as moving from the outside to the inside of the house during the imaging. Thus, it is preferable to operate the video camera in a simplified manner during the imaging as much as possible.

The invention addresses the above-identified, and other problems associated with conventional methods and apparatuses. It is desirable to readily carry out the control of the amount of imaging light and the collection of color temperature in coordination with each other.

According to an embodiment of the invention, there is provided an imaging method. The method includes: selectively arranging one or a plurality of optical filters in a path of an optical system for obtaining imaging light; detecting the type of the one or the plurality of optical filters arranged in the optical system; and adjusting a setting value of color temperature of an imaging signal obtained by capturing the image to color temperature defined for each optical filter detected by the detection.

With such processing, color temperature to be set at the time of processing on imaging signals can also be set automatically to color temperature defined for each filter only by selecting the optical filter. Therefore, a person carrying out imaging operation may only carry out the selection of optical filters such as ND filters. Thus, there is no need to carry out any operation for defining color temperature in usual imaging procedures.

According to the embodiment of the invention, a person who performs an imaging operation may only select any of optical filters, such as an ND filter. Usual imaging has no need to set color temperature, so that the setting operation for imaging can be carried out readily. For example, when the photographer moves outdoors from a dark room while imaging, an appropriate ND filter is selected after moving from the environment without the use of an ND filter. In this case, color temperature can be automatically set to one suitable for outdoor imaging from one suitable for indoor imaging, thereby simplifying the imaging operation.

BRIEF DESCRIPTION OF THE DRAWINGS

FIG. 4 is a diagram illustrating an example of color temperature setting (Example 1) of an imaging apparatus in accordance with an embodiment of the invention.

FIG. 5 is a diagram illustrating an example of color temperature setting (Example 2) of an imaging apparatus in accordance with an embodiment of the invention.

FIGS. 6A to 6C are diagrams respectively illustrating examples of the color temperature setting on a menu screen of an imaging apparatus in accordance with an embodiment of the invention.

BEST MODE FOR CARRYING OUT THE INVENTION

Hereinafter, an embodiment of the invention will be described with reference to FIGS. 1 to 6.

Figure 1:
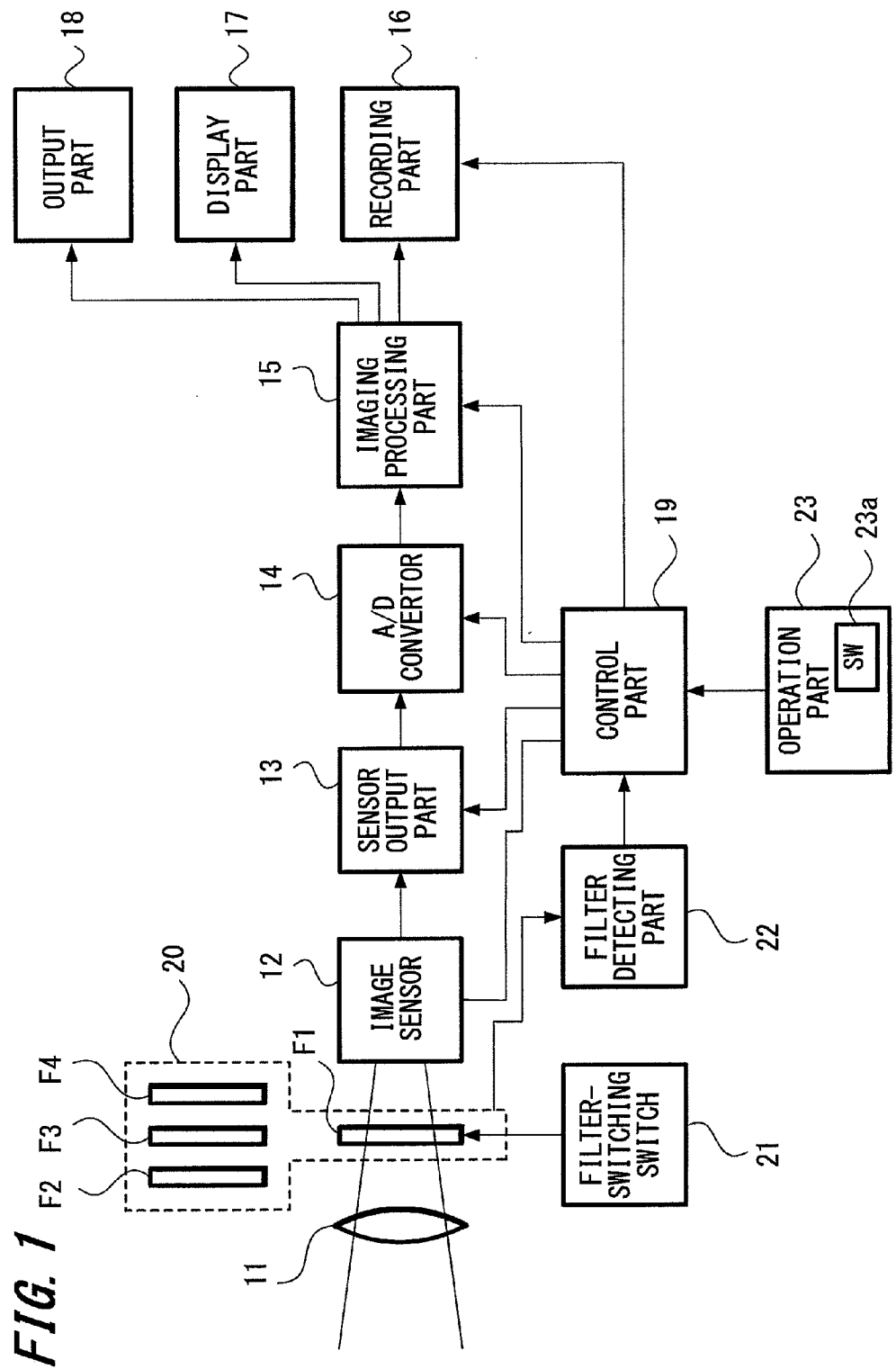
FIG. 1 is a block diagram illustrating a configuration of an imaging apparatus in accordance with an embodiment of the invention.

FIG. 1 is a block diagram showing a configuration of an imaging apparatus according to the embodiment of the invention. The configuration of the imaging apparatus will be described with reference to FIG. 1. Imaging light passing through a lens 11 forms an image on the imaging surface of an image sensor 12. The imaging light is then converted into an electric signal at the image sensor 12. Subsequently, a sensor output part 13 reads the converted electric signal. The electric signal read at the sensor output part 13 is referred to as an imaging signal.

As shown in FIG. 1, the lens 11 is represented as a single lens for simplifying the description thereof. In fact, however, the lens 11 is formed of a plurality of lenses (a plurality of lens groups) and may be provided as a zoom lens. Furthermore, although not shown in the figure, an iris or a diaphragm mechanism is arranged in the optical path of the lens 11. A CCD image sensor or a CMOS image sensor, for example, is used as the image sensor 12. In addition, the light may be subjected to color separation with a prism on the preceding stage of the image sensor 12. In this case, the image sensor 12 may include a plurality of image sensors (e.g., three image sensors).

Furthermore, according to the embodiment, a filter-rotation mechanism part 20 is arranged in the optical path of imaging light between the lens 11 and the image sensor 12. The filter-rotation mechanism part 20 has four filter placement positions F1, F2, F3, and F4. Thus, optical filters having different characteristics can be placed on the respective positions. Among the positions F1 to F4, the position F1 remains without any optical filter. On the other hand, ND filters to reduce different amounts of light are arranged on the other three positions F2, F3, and F4, respectively. Specifically, for example, an ND filter for reducing the amount of light to one-fourth is arranged on the filter placement position F2. Also, an ND filter for reducing the amount of light to one-sixteenth is arranged on the filter placement position F3. In addition, an ND filter for reducing the amount of light to one-sixty fourth is arranged on the filter placement position F4.

The filter-rotation mechanism part 20 configured as described above is capable of selecting the filter position by the operation of a filter-switching switch 21. The selected filter position is detected by a filter-detecting part 22.

The detected filter position is determined at a control part 19. Here, the control part 19 is provided for controlling the imaging operation of the imaging apparatus. The control part 19 is operable, when the control part 19 has determined the filter position, to adjust the color temperature to a predetermined color temperature of the filter located at the determined filter position. Such control processing will be later described in detail.

Subsequently, after the sensor output part 13 reads the imaging signal obtained by the image sensor 12, the imaging signal output from the sensor output part 13 is supplied to an analog/digital (A/D) converter 14 and then converted into a digital signal. The digitized imaging signal is supplied to an imaging-processing part 15 and then subjected to various kinds of signal processing. The processing in the imaging-processing part 15 is carried out under the control of the control part 19, and the imaging signal can be subjected to image processing including color temperature correction, gamma correction and the like. Primary RGB color signals of the imaging signal are converted into luminance/chroma (Y/C) signals, thereby providing an image signal conforming to a predetermined image signal format. A value of color temperature in the color-temperature correction processing carried out in the imaging-processing part 15 is set according to a command from a control part 19. In this embodiment, the imaging-processing part 15 can set color temperature value to any of, for example, four different stages: 3200 k, 4300 k, 5600 k, and 6300 k.

The image signal output from the imaging-processing part 15 is supplied to a recording part 16 and then recorded in a recording medium such as a disk, tape, or memory device, displayed on a display part 17, and outputted from an image signal output part 18 to the outside. In addition to the image obtained by the imaging, various types of setup screens and guide screens, such as a menu screen may be displayed on the display part 17 upon receiving instructions from the control part 19. Image signals for displaying the menu screen and so on are prepared at the imaging-processing part 15.

The control part 19 for controlling the imaging in the imaging apparatus receives operation instructions from an operation part 23. The operation part 23 includes various kinds of operation switches and operation keys provided for the imaging apparatus. The operation part 23 supplies the instructions of starting or stopping the imaging or the like to the control part 19, thereby allowing the control part 19 to control the imaging correspondingly. The recording (storage) in the medium at the recording part 16 can also be controlled by the control part 19. In this embodiment, the operation part 23 includes a color-temperature preset switch 23a. In the case of turning on the color-temperature preset switch 23a, the control part 19 forcibly sets the color temperature at the imaging-processing part 15 to the preset value.

Furthermore, although not shown in the figure, the operation part 23 includes direction-indicator keys and a determination key. The direction-indicator keys are marked with arrows indicating at least four directions of left, right, up, and down, respectively, while the determination key is provided for accepting the entry. The operation of these keys leads to the selection of each item in the menu screen displayed on the display part 17. According to the embodiment, the absolute and relative values of color temperature or the like can be set on the menu screen. It should be noted that the display part 17 may be a touch panel to carry out the operation on the menu screen without using direction-indicator keys or the like.

Next, an example of the filter-rotation mechanism part 20 will be described with reference to FIG. 2. The filter-rotation mechanism part 20 is arranged at the front of the imaging area of the image sensor 12 (or the front of the incident surface of a color separation prism). The filter-rotation mechanism part 20 includes a rotating plate 20a which can rotate around the central axis thereof. In this embodiment, the rotating plate 20a is provided with four filter-placement positions F1, F2, F3, and F4 equally spaced at an angle of 90 degrees.

The four filter-placement positions F1, F2, F3, and F4 are configured as follows. The filter-placement position F1 remains without any optical filter (or with optically transparent plates). An ND filter for reducing the amount of light to one-fourth is arranged on the filter placement position F2. Also, an ND filter for reducing the amount of light to one-sixteenth is arranged on the filter placement position F3. In addition, an ND filter for reducing the amount of light to one-sixty fourth is arranged on the filter placement position F4.

The rotating plate 20a is configured to rotate by a rotating plate driving part 20b. In other words, the rotating plate 20a is able to rotate 90 degrees at a time by the operation of the filter-switching switch 21 not shown in FIG. 2. The filter-detecting part 22 detects the rotational angle position of the rotating plate 20a to obtain the positioning information thereof. Then, the control part 19 is allowed to determine the filter currently located at the front of the imaging area of the image sensor 12 based on the positioning information detected by the filter-detecting part 22. According to the embodiment, the control part 19 controls the color temperature setting in the imaging-processing part 15 depending on the determined filter.

Next, referring now to a flowchart represented in FIG. 3, the process of color temperature setting in the imaging processing part 15 under the control of the control part 19 will be described.

First, the control part 19 determines whether the color-temperature preset switch 23a has been ON (Step S11). Here, when it is determined that the color-temperature preset switch 23 is in the ON state, the color temperature is set to a preset color temperature (Step S12). The preset color temperature may be, for example, 5600 k. After setting to the preset color temperature, then the process returns to Step S11 for determining whether the color-temperature preset switch 23a is in an ON state.

When it is determined that the color-temperature preset switch 23a is not in the ON state (i.e., it is in an OFF state), a determination is made whether the filter detecting part 22 detects a filter-switching movement (Step S13). Here, if the filter-switching movement is not detected, the process returns to the procedure of Step 11 while the current state of color temperature setting is retained.

When the filter-switching movement is detected, a determination is made whether the current filter position corresponds to the filter-absent position F1 (Step S14). If the determination concludes that the current position is the filter-absent position F1, the color temperature is set to 3200 k (Step S15) and the process returns to Step S11.

When it is determined in Step s14 that the filter-switching movement is to any position other than the filter-absent position F1, a determination is made whether the switching to any of filter-present positions F2, F3, and F4 is carried out (Step S16). If the determination concludes that the switching is to any of positions F2, F3, and F4, the color temperature is adjusted to 5600 k (Step S17) and the process returns to Step S11.

Figure 3:
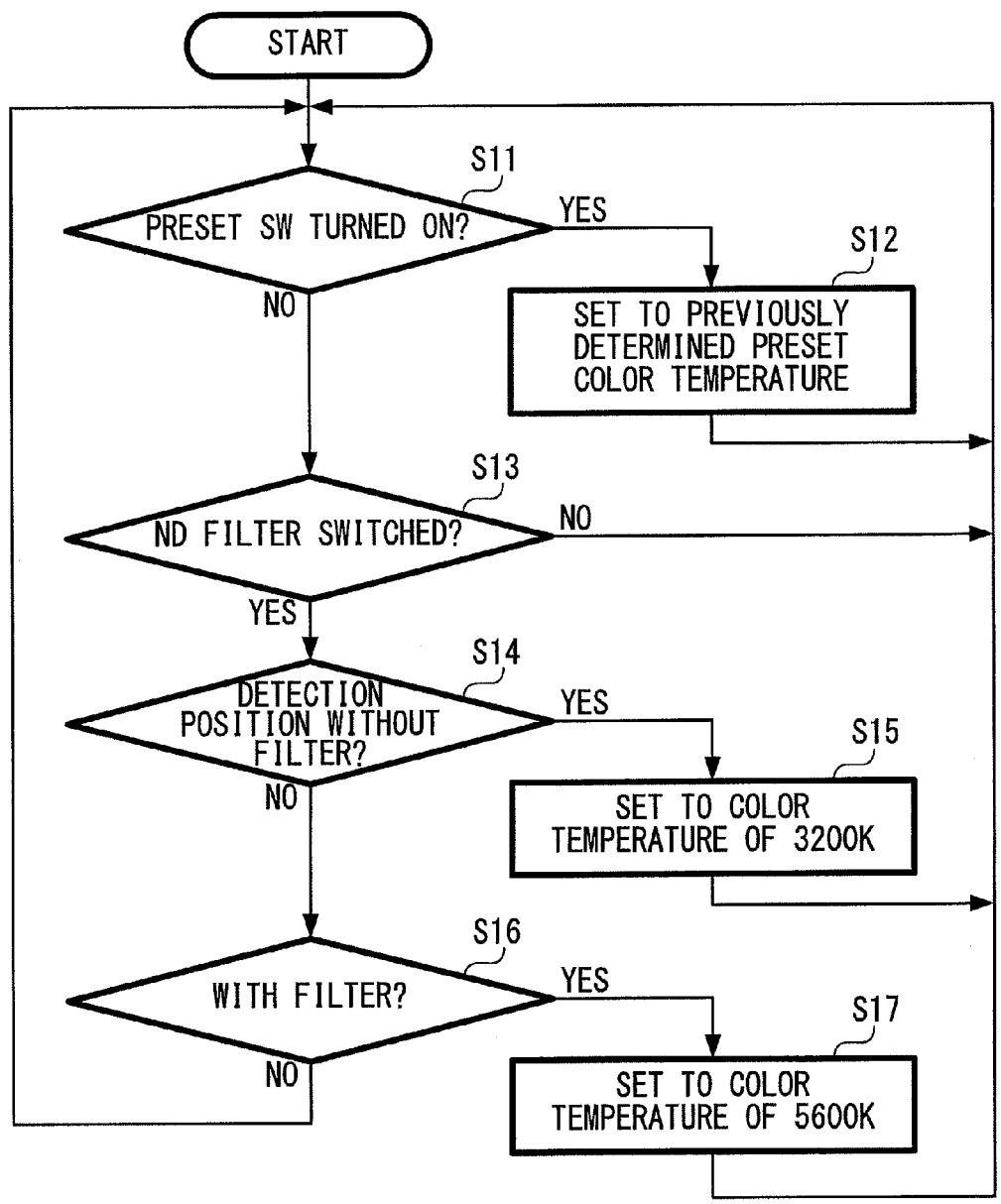
FIG. 3 is a flowchart illustrating exemplified processing of color temperature setting of an imaging apparatus in accordance with an embodiment of the invention.

The process illustrated in FIG. 3 can be summarized in a table as shown in FIG. 4. Specifically, the color temperature is set to 3200 k in the absence of an ND filter. The color temperature is set to about 5600 k when the ND filter for reducing the amount of light to ¼, ¹⁄₁₆, or ¹⁄₆₄. Furthermore, regardless of the selected filter, the color temperature is set to a preset color temperature (5600 k in this embodiment) when the preset switch 23a is in the ON state.

As shown in FIGS. 3 and 4, all of three different ND filters are arranged to set up the same color temperature in the embodiment. Alternatively, as shown in FIG. 5, the color temperatures of the respective positions may vary, for example, among 3200 k, 4300 k, 5600 k, and 6300 k in the order from the filter-absent position depending on the reducing amount of light.

The color temperature to be set depending on the selected position of each filter may be adjusted by a user without limitation. Such an adjustment may be carried out with an operation on the displayed menu screen or the like.

For example, as shown in FIG. 6A, the user instructs the display of color-temperature display screen as the menu screen. Thus, four different filter positions ND1, ND2, ND3, and ND4 (ND1, ND2, ND3, and ND4 correspond to filter positions F1, F2, D3, and F4 in FIG. 2, respectively) are displayed on the display part 17. Also, the color temperature under current setting when the color correction preset switch is ON state is displayed on the display part 17. Under the state of displaying the menu screen, any of filter positions is selected by a key operation. Then, the operation of changing the color temperature of the selected filter position is carried out. Subsequently, the changed color temperature is stored in a memory in the control part 19 as a color temperature at the time of selecting the corresponding filter.

For example, an example shown in FIG. 6B illustrates that the filter position ND3 is selected and selectable candidate temperatures of 3200 k, 4300 k, 5600 k, and 6300 k are listed. Among the represented candidates, any of color temperatures is set. For example, as shown in FIG. 6C, the changed color temperature can be represented. An example shown in FIG. 6C illustrates that color temperature for the filter position ND3 is changed to 6300 k. The color temperature that is set when the color correction preset switch is in the ON state can also be changed in a similar manner while the user watches the menu screen.

Furthermore, examples of movements associated with other functions when the preset switch is operated are described in the followings.

In the case of turning on another switch or changing a menu for another one while the preset switch is in an ON state, the preset switch remains in the ON state even when any of other switches is turned on or the menu is changed.

In the case of changing the value of a preset switch of the menu while the preset switch is in the ON state, the set value after the changing is immediately reflected.

In the case of carrying out automatic white balance (AWB) adjustment while the preset switch is in the ON state (i.e., a white memory switch (White SW) is not preset), the preset switch is turned off at the moment of turning on the AWB, resulting in blacking out. Even after the completion of AWB, the correction of AWB is reflected while the preset switch is in the OFF state.

When AWB is carried out while the preset switch is in the ON state (when the white SW is not preset), the preset switch is given priority over other switches and the AWB becomes invalid.

When the white SW is switched while the preset switch is in the ON state, the preset switch is given priority over other switches and the white SW becomes invalid.

When the ND filter is switched while the preset switch is in the ON state, the preset switch is given priority over other switches and the offset of ND becomes invalid.

When an automatic tracking white balance (ATW) is turned on while the preset switch is in the ON state, the preset switch is given priority over other switches and the ATW becomes invalid.

When the preset switch is turned on while the ATW is in the ON state, the ATW is turned off at the moment of switching the preset switch on and the preset switch is then lit, thereby reflecting the setting of color temperature correction of the preset switch. The ATW returns to ON when the preset switch is turned off.

When the power supply is turned off and then turned on while the preset switch is in the ON state, the preset switch remains in the ON state.

When an external controller is connected, the control can be carried out from the outside as long as the preset switch is in the ON state.

When the external controller turns on an electric color-temperature converting switch, the preset switch is turned on. The color temperature reflects a value defined in the menu. The preset switch is turned off when the electric color-temperature converting switch of the external controller is turned on while the preset switch is in the ON state.

When any switch other than the above mentioned switches is turned on or the menu is changed while the preset switch is turned on, the preset switch remains in the ON state even at the time of turning on any of other switches. The preset switch remains in the ON state even at the time of changing any of other menu items.

When the setting value of the preset switch on the menu is changed while the preset switch is in the ON state, the setting value after the change is immediately reflected.

As described above, according to the imaging apparatus of the embodiment, the color temperature is automatically set to a predetermined value by carrying out the operation of selecting the ND filter. Therefore, the operation at the time of imaging can be simplified greatly. In general, ND filters are often used in imaging outdoors with a large amount of light. Thus, an appropriate color temperature can be obtained by automatically determining the color temperature suitably applied in such outdoor imaging. On the other hand, the imaging without the use of any ND filter is often carried out in a room. Color temperature suitable for imaging indoors is set, so that an appropriate color temperature can be automatically obtained.

If the color temperature correction automatically carried out on the basis of the filter selection is inappropriate, the color-temperature preset switch 23a is turned on and a forcibly preset color temperature can be obtained immediately. Thus, the color temperature can also be set by reflecting the user's desire. Therefore, the automatic color temperature setting may not lead to any inconvenient matter.

In this embodiment, furthermore, the imaging apparatus is provided with a single color-correction preset switch 23a so that the color temperature can be set to a single preset color temperature. Alternatively, for example, a plurality of color-correction preset switches may be arranged so that these switches can be provided with their respective preset color temperatures to allow the user to select one from the plural color temperatures at the time of operating the color-correction preset switch.

Furthermore, the relationships between the filters and the color temperatures as described in the above embodiment are examples and the values thereof are not limited thereto. In the above embodiment, furthermore, four color temperatures are set. Alternatively, the color temperature can be set in narrower temperature intervals. In addition, the amount of light reduced by the ND filter may be any value other than one described above. In addition, optical filters having other characteristic features than those of the ND filters may be arranged to set the predetermined color temperature when any of such optical filters is selected.

Figure 2:
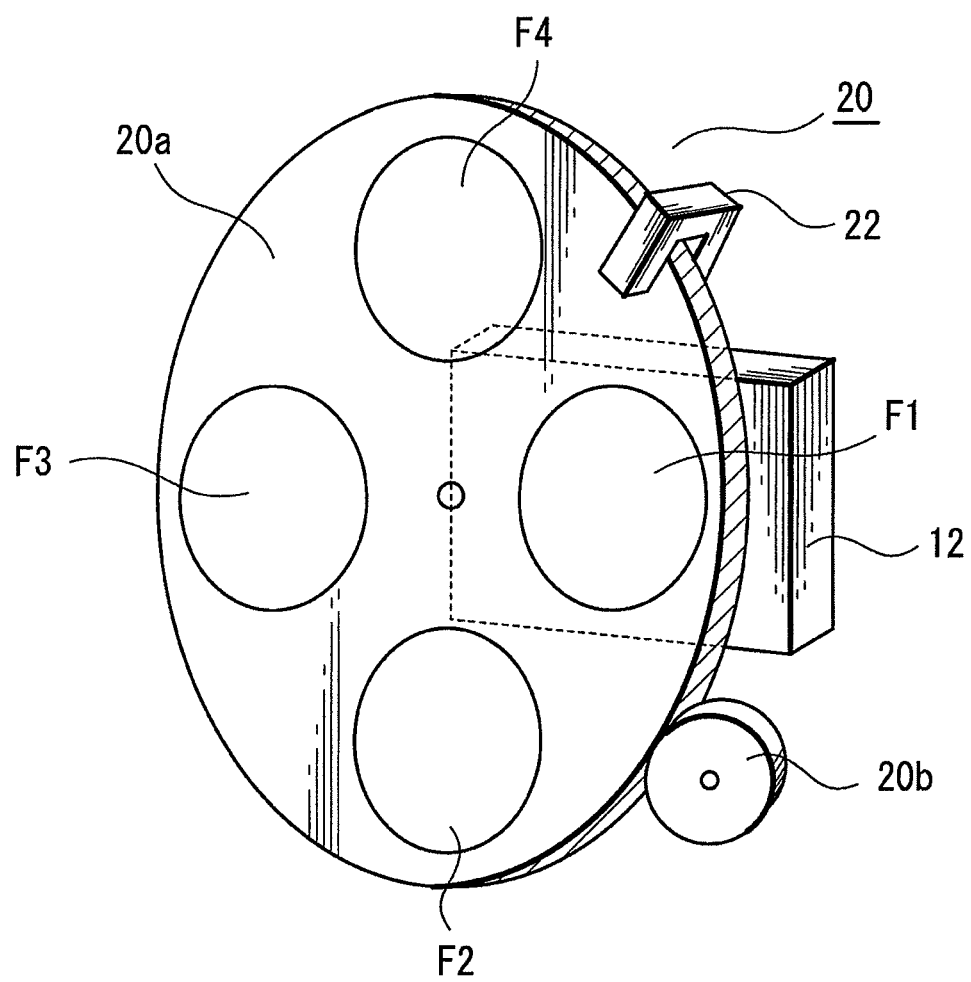
FIG. 2 is a perspective view of an exemplified filter rotation mechanism of an imaging apparatus in accordance with an embodiment of the invention.

Furthermore, the filter rotation mechanism shown in FIG. 2 is only an example, so that the embodiment of the invention will not be limited to the configuration of the film rotation mechanism as shown in FIG. 2. The number of filters attached to such a mechanism is not limited to four different filters (including no filter) in the embodiment shown in FIG. 2 and any other number of filters may be thus employed. For example, the imaging apparatus can select either one state in which only one filter is prepared and arranged in the optical path or the other state in which the filter is removed. In this case, the color temperature to be set when such one filter is arranged may be defined as a specific color temperature.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
    a plurality of neutral density filters each selectively arranged in a path of an optical system for obtaining imaging light;
    an image sensor for converting the imaging light obtained through the optical system into an imaging signal;
    an imaging signal processing part for subjecting the imaging signal from the image sensor to color-temperature correction processing;
    a detecting part for detecting a type of each neutral density filter selectively arranged in the path of the optical system; and
    a control part for adjusting a color temperature that is set at the imaging signal processing part to a color temperature defined for each neutral density filter detected by the detecting part.

2. The imaging apparatus according to claim 1, further comprising:
    a color-temperature preset switch, wherein
    when the color-temperature preset switch is operated, the control part adjusts the color temperature set at the imaging signal processing part to a preset color temperature determined in advance, without depending on the arrangement of the plurality of neutral density filters detected by the detecting part.

3. The imaging apparatus according to claim 1, wherein
    the control part is capable of varying the color temperature defined for each neutral density filter by a predetermined operation.

4. An imaging method, comprising the steps of:
    selectively arranging each of a plurality of neutral density filters in a path of an optical system for obtaining imaging light;
    converting the imaging light obtained into an imaging signal using an image sensor;

subjecting the imaging signal from the image sensor to color-temperature correction processing;

detecting a type of the each neutral density filter selectively arranged in the path of the optical system; and adjusting a setting value of color temperature of an imaging signal obtained by capturing an image to a color temperature defined for each neutral density filter detected.

* * * * *